United States Patent [19]

Gmelin

[11] Patent Number: 4,745,903
[45] Date of Patent: May 24, 1988

[54] PRESSURE REGULATING VALVE

[75] Inventor: Karl Gmelin, Flein, Fed. Rep. of Germany

[73] Assignee: Robert Bosch GmbH, Struttgart, Fed. Rep. of Germany

[21] Appl. No.: 30,189

[22] Filed: Mar. 26, 1987

[30] Foreign Application Priority Data

Jul. 12, 1986 [DE] Fed. Rep. of Germany ....... 3623666

[51] Int. Cl.$^4$ ............................................. F02M 39/00
[52] U.S. Cl. .................................... 123/452; 123/456; 123/459
[58] Field of Search ............... 123/506, 452, 453, 454, 123/455, 456, 459, 462

[56] References Cited

U.S. PATENT DOCUMENTS

| 3,946,714 | 3/1976 | Eckert | 123/456 |
|---|---|---|---|
| 3,957,779 | 4/1976 | Jäggle et al. | 123/452 |
| 4,075,995 | 2/1978 | Kramer | 123/454 |
| 4,341,192 | 7/1982 | Knapp | 123/452 |
| 4,354,472 | 10/1982 | Knapp | 123/459 |
| 4,383,513 | 5/1983 | Omelin | 123/459 |
| 4,408,587 | 11/1983 | Wissmann | 123/456 |
| 4,467,766 | 8/1984 | Wissmann | 123/456 |
| 4,474,158 | 10/1984 | Mowbray | 123/506 |
| 4,549,515 | 10/1985 | Maisch | 123/455 |
| 4,621,604 | 11/1986 | Abthoff | 123/459 |

Primary Examiner—Carl S. Miller
Attorney, Agent, or Firm—Edwin E. Greigg

[57] ABSTRACT

A pressure regulating valve is proposed which serves to regulate a constant pressure of a medium. The pressure regulating valve includes a valve housing and a regulating piston, which is supported in a slide bore such that it is displaceable by the pressure of the medium counter to the force of a regulating spring. The regulating piston includes a valve closing element that cooperates with a valve seat and a regulating face that upon a displacement movement of the regulating piston that is longer than a predetermined displacement path (s) opens an outflow opening in the valve housing. A bypass conduit is provided in the regulating piston, beginning at one end at the regulating face and terminating at the other in a relief opening disposed in a circumferential wall of the regulating piston. Upon a displacement of the regulating piston, the relief opening communicates with the outflow opening only whenever the displacement path of the regulating piston away from the valve seat is shorter than the predetermined displacement path (s). To attain a rapid closing movement of the regulating piston and to lower the regulated pressure, the medium can flow out via the bypass conduit during the closing movement.

5 Claims, 1 Drawing Sheet

U.S. Patent
May 24, 1988
4,745,903
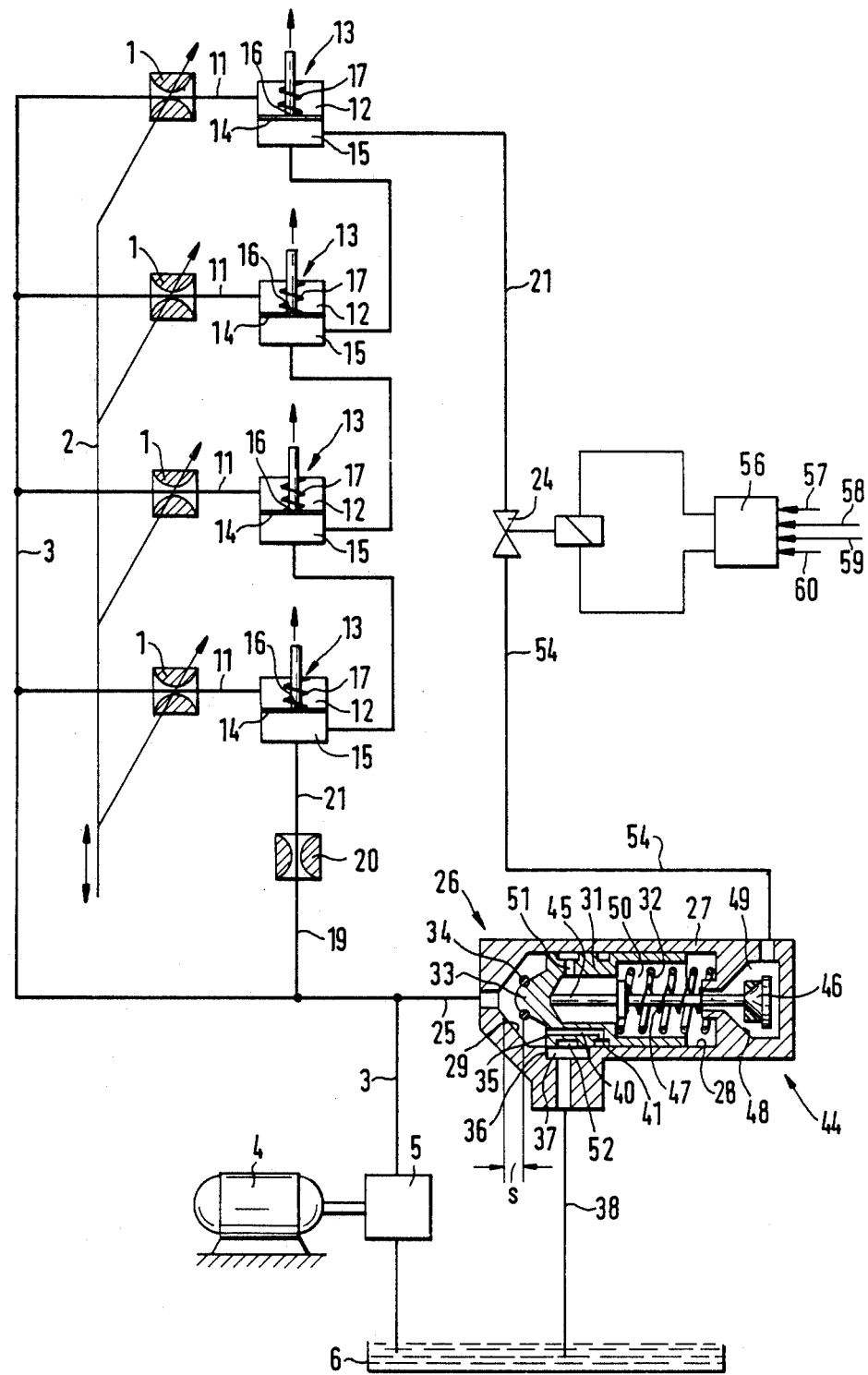

PRESSURE REGULATING VALVE

FIELD OF THE INVENTION

The invention is directed to improvements in pressure regulating valves in particular for use in fuel injection systems of internal combustion engines.

BACKGROUND OF THE INVENTION

A pressure regulating valve is already known (German Offenlegungsschrift No. 23 29 667), in which to perform the closing function the regulating piston has a diameter reduced by comparison with that of the slide bore in such a way that pressure in a piston chamber can be relieved during the closing operation via the annular gap between the regulating piston and the slide bore. This relatively large amount of piston play, however, means that during the regulating operation as well, the pump has to pump a certain amount of fuel that flows uselessly back via the piston play, in the form of leakage. Such losses due to leakage make the prior art device relatively inefficient.

OBJECT AND SUMMARY OF THE INVENTION

A principal object of the pressure regulating valve according to the invention is to provide the advantage over the prior art that a medium can flow past the regulating piston via the bypass conduit for pressure relief only during the closing operation, which reduces in total the quantity of the medium that must be pumped by the pump, thus rendering the valve more efficient than heretofore known valves.

The invention will be better understood and further objects and advantages thereof will become more apparent from the ensuing detailed description of a preferred embodiment taken in conjunction with the single drawing FIGURE.

BRIEF DESCRIPTION OF THE DRAWING

The single drawing FIGURE is a simplified representation of a fuel injection system showing details of a pressure regulating valve according to the invention.

DESCRIPTION OF THE PREFERRED EMBODIMENT

The fuel injection system shown by way of example in the drawing includes metering valves 1, one of which is associated with each cylinder of a mixture-compressing internal combustion engine having externally supplied ignition (not shown). At the metering valve 1, a quantity of fuel that is in a predetermined ratio with the quantity of air aspirated by the engine is metered. The fuel injection system shown as an example has four metering valves 1 and so is intended for a four-cylinder engine. The cross section of the metering valves is variable, for instance in common, as indicated, by means of an actuating element 2 in accordance with engine operating characteristics as a function of the quantity of air aspirated by the engine. The metering valves 1 are located in a fuel supply line 3, into which fuel is pumped from a fuel tank 6 by a fuel pump 5 driven by an electric motor 4.

Downstream of each metering valve 1, there is a line 11 by way of which the metered fuel reaches a regulating chamber 12 of a regulating valve 13, a separate one of which is associated with each metering valve 1. The regulating chamber 12 of the regulating valve 13 is divided from a control chamber 15 of the regulating valve 13 by a movable valve element, for example embodied as a diaphragm 14. The diaphragm 14 of the regulating valve 13 cooperates with a fixed valve seat 16 provided in the regulating chamber 12, by way of which valve seat the metered fuel can flow out of the regulating chamber 12 to the individual injection valves, not shown, in the intake tube of the engine. A spring 17 may also be disposed in the regulating chamber 12, urging the diaphragm 14 in the opening direction of the regulating valve 13.

Branching off from the fuel supply line 3 is a line 19, which discharges via a control throttle 20 into a control pressure line 21. Downstream of the control throttle 20 in the control pressure line 21 are the control chambers 15 of the regulating valves 13, and downstream of the control chambers 15 is a control pressure valve embodied as an electromagnetic valve 24. A tie line 25 also branches off from the fuel supply line 3, and disposed in the tie line is a pressure regulating valve 26, by means of which a constant fuel pressure is maintained upstream of the fuel metering valves 1.

The pressure regulating valve 26 has a valve housing 27 with a slide bore 28, which terminates in a conical portion serving as a valve seat 29. The tie line 25 discharges into the slide bore 28 at the valve seat 29. A regulating piston 31 is supported in the slide bore 28 and is displaceable by the pressure of the fuel present via the tie line 25, counter to the force of a regulating spring 32. Oriented toward the valve seat 29, a conically embodied valve closing element 33 is embodied on the regulating piston 31, bearing a sealing ring 34 which, when the pressure regulating valve 26 is closed, rests on the valve seat 29 and rises from the valve seat 29, opening the pressure regulating valve 26, at a fuel pressure in the fuel supply line 3 above approximately 3 bar. Adjoining the valve closing element 33 downstream, a radially outwardly extending regulating face 35 is embodied on the regulating piston 31, which face 35 does not come to coincide with a regulating edge 36 of an outflow opening 37 until after a predetermined displacement path s of the valve closing element away from the valve seat 29; the outflow opening 37 begins at the regulating edge 36 and extends away from the valve seat 29 in the valve housing 27 and leads from the wall of the slide bore 28 to a return line 38, by way of which fuel can return to the fuel tank 6.

Excess fuel thus return in the following manner: whenever the regulating piston 31 is displaced by the fuel pressure, counter to the force of the regulating spring 32, away from the valve seat 29 by a distance greater than the predetermined displacement path s, so that the regulating face 35 reaches the vicinity of the outflow opening 37 and opens the outflow opening 37 to a variable extent, fuel can flow out of the slide bore 28 between the regulating face 35 and the regulating edge 36 to the outflow opening 37, and from there to the return line 38. The pressure regulating valve 26 then regulates the fuel pressure in the fuel supply line 3 constantly to a pressure of approximately 5 bar. A bypass conduit 40 is embodied in the regulating piston 31, beginning at one end at the regulating face 35 and terminating at the other at a relief opening 41 at the circumference of the regulating piston 31 in such a manner that upon a displacement of the regulating piston 41 the relief opening 41 communicates with the outflow opening 37 only when the displacement path of the regulating piston 31 away from the valve seat 29 is shorter than the predetermined displacement path s.

Should the regulating piston 31 be displaced by a displacement path that is longer than the predetermined displacement path s, then the relief opening 41 is closed with respect to the outflow opening 37. Thus, when the regulating piston 31 is performing its regulating function, that is, when the regulating face 35 is opening the outflow opening 37 to a variable extent toward the slide bore 28, no fuel flow takes place via the bypass conduit 40. If the fuel pump 5 is shut off, the dropping fuel pressure causes the regulating piston 31 to move toward the valve seat 29. To prevent the fuel present in the fuel injection system from being ejected in an undesirable manner because the residual pressure in the system is still higher than the opening pressure of the injection valves, it is provided that fuel can still reach the return line 38 from the fuel supply line 3 via the bypass conduit 40 during the predetermined displacement path s until the sealing ring 34 is seated on the valve seat 29. This bypass conduit serves to enable a rapid relief of pressure in the fuel injection system to below the opening pressure of the injection valves. When the engine is then started, a higher fuel pressure, which is desirable, is required in order to lift the regulating piston 31 from the valve seat 29 and displace it into its regulating position, because the diameter of the sealing ring 34 is smaller than that of the regulating face 35, so that because of this increased fuel pressure at starting, a complete filling of the entire fuel injection system, and hence dependable starting, is assured.

By means of the opening regulating piston 31, a push-open valve 44 can be opened at the same time. To this end as the regulating piston 31 opens and with the fuel pump 5 pumping, the regulating piston engages an actuating pin 45, which is displaceably supported in the valve housing 27 and displaces the movable valve element 46 of the push-open valve 44, counter to the force of a push-open spring 47, in the opening direction, lifting it from a push-open valve seat 48. The movable valve element 46 is disposed in a valve chamber 49, which communicates via the conical push-open valve seat 48 with the slide bore 28 at the end of the regulating piston 31 remote from the valve closing element 33. Via a blind bore 50 open toward the push-open valve 44, a radial bore 51 and an annular groove 52 in the regulating piston 31, fuel can reach the outflow opening 37 when the push-open valve 44 is opened and from there can return to the fuel tank 6 If no further fuel is pumped by the electric fuel pump 4, 5, then the pressure regulating valve 26 closes and at the same time the push-open spring 47 engaging the actuating pin 45 displaces the movable valve element 46 of the push-open valve 44 toward the push-open valve seat 48 and hence in the closing direction.

With the electromagnetic valve 24 open, fuel can flow out of the control pressure line 51 into an outflow line 54, which discharges into the pressure regulating valve 26 upstream of the push-open valve 44, so that with the push-open valve 44 open fuel can flow out of the outflow line 54 into the return line 38 and from there to the fuel tank 6, or to the intake side of the pump. With the fuel pump 5 not pumping, the closed push-open valve 44 and the closed pressure regulating valve 26 prevent fuel from leaking out of the control pressure line 21 and tie line 25; as a result, the fuel injection system remains filled with fuel, so that the engine is ready to start.

The electromagnetic valve 24 is triggerable in a known manner by an electronic control unit 56 to which engine operating characteristics can be supplied, such as rpm 57, throttle valve position 58, exhaust gas composition (from an oxygen sensor) 59, temperature 60, and other parameters. The electromagnetic valve 24 is controlled in a clocked manner; that is, the ratio of the opening duration to the closing duration is varied.

The foregoing relates to a preferred exemplary embodiment of the invention, it being understood that other variants and embodiments thereof are possible within the spirit and scope of the invention, the latter being defined by the appended claims.

What is claimed and desired to be secured by letters Patent of the United States is:

1. A pressure regulating valve, in particular for a fuel injection system comprising a valve housing having a slide bore defined therewithin and a regulating piston disposed in said slide bore, said regulating piston being displaceable to a variable extent in said slide bore as a function of pressure of a medium supplied thereto counter to force of a regulating spring, said regulating piston including a valve closing element arranged to cooperate with a first valve seat, said first valve seat being adapted to connect to fuel inlet lines of said fuel injection system, said valve closing element having a radially outwardly directed regulating face extending downstream thereof, the regulating face adapted to selectively access an outflow opening provided through the slide bore to communicate with a return fuel line upon a minimum displacement of the regulating piston being effected by pressure applied by the medium, said minimum displacement being travel of said regulating piston for a predetermined displacement path (s) in an axial direction away from the valve seat toward the outflow opening, said regulating piston further including a bypass conduit extending from the regulating face of said piston through a portion of said piston and terminating at a circumferential wall thereof in a relief opening, the relief opening being adapted to communicate with the outflow opening during that interval of path in which the piston has travelled a displacement path less than said predetermined displacement path (s).

2. A pressure regulating valve as claimed in claim 1, further wherein said regulating valve includes a second valve means disposed at an opposite end thereof from said first valve seat, and said second valve means includes a closing element connected via pin means to said regulating piston and operative against a second valve seat.

3. A pressure regulating valve as claimed in claim 2, further wherein said second valve means communicates with an outflow line from an electromagnetic valve provided in a control pressure fuel line of said fuel injection system.

4. A pressure regulating valve as claimed in claim 3, further wherein said second valve means includes spring means adapted to close the closing element against said second valve seat when fuel ceases being pumped through the injection system.

5. A pressure regulating valve as claimed in claim 2, further wherein said regulating piston includes a blind bore extending substantially therethrough to communicate with a radial bore disposed in said regulating piston and further communicate with an annular groove provided in said circumferential wall of said regulating piston, said annular groove being adapted to communicate fuel with said outflow opening while said second valve means is open.

* * * * *